Nov. 2, 1965       F. J. KLEMPAY       3,215,316
POWER SPRAYING EQUIPMENT
Filed Sept. 10, 1963

INVENTOR.
Francis J. Klempay

United States Patent Office 3,215,316
Patented Nov. 2, 1965

3,215,316
POWER SPRAYING EQUIPMENT
Francis J. Klempay, 5635 Tippecanoe Road,
Canfield, Ohio
Filed Sept. 10, 1963, Ser. No. 308,003
5 Claims. (Cl. 222—167)

This invention relates to power spraying equipment having special utility for lawn maintenance and horticultural purposes. While simple low-pressure pumps are adequate for handling liquid fertilizers, weed killers, etc., high pressure is required for most shrubs and trees, and heretofore piston-type of mechanisms have been offered to meet this need. However, the adaptation of the same to mobile power sources presents serious problems as does also the provision of a tank on the mobile equipment for carrying along a reasonable quantity of mixed liquid spray material. It is the primary object of the present invention to provide exceedingly simple yet adequate equipment which solves both these problems.

A further object of the invention is the provision of practical equipment having the characteristics outlined above which is readily adaptable for use with the currently popular small lawn and garden tractors either of the walking or riding type. In this aspect the invention is characterized by the utmost simplicity with which the equipment may be connected to and detached from the tractor whereby while the tractor engine may furnish power for both spraying and movement the tractor may quickly be readied and made available for other uses.

Another object of the invention is the provision of improved arrangement for containing and transporting the liquid spray material in portable power spraying equipment. In accordance with this more specific aspect of the invention I provide a specially constructed hollow roller to carry the liquid and from which the liquid may be withdrawn to the spray pump. With this arrangement, large quantities of liquid may be safely transported even on soft ground, and the dual function of the equipment further enchances its utility. Moreover, the spray equipment itself is simplified since rotation of the roller may be relied on to keep the liquid properly mixed.

The above and other objects and advantages of the invention will become apparent upon consideration of the following specification and the accompanying drawing wherein there is disclosed one representative embodiment of the invention.

Figure 1:
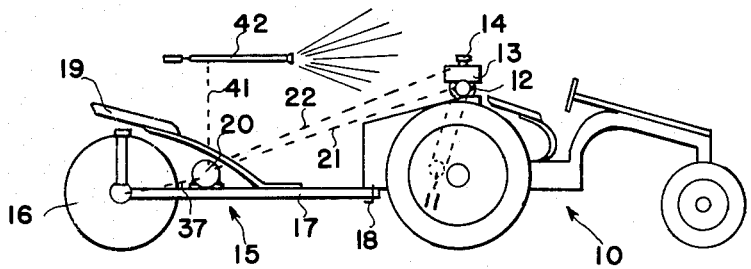
FIGURE 1 is a schematic showing of tractor-drawn spray equipment constructed in accordance with the principles of the invention.
Figure 2:
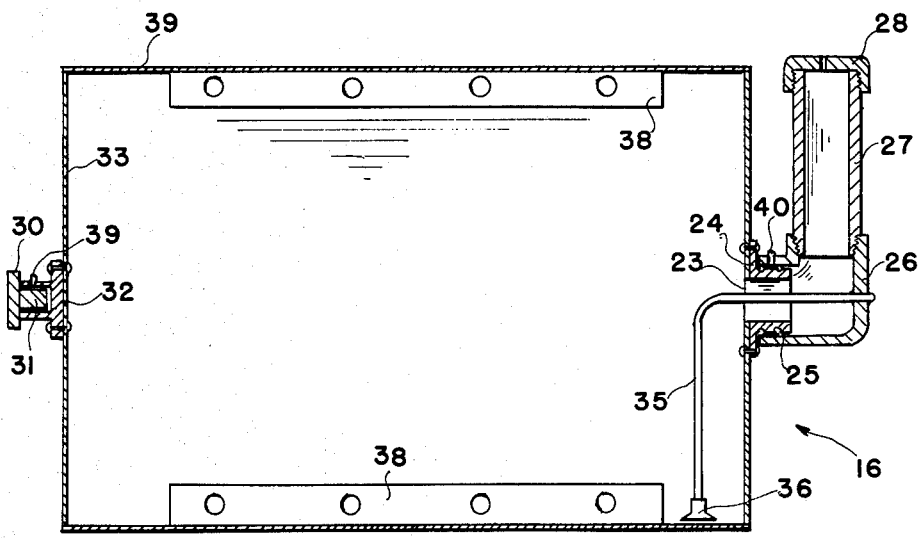
FIGURE 2 is a sectional view of the roller tank used in the assembly of FIGURE 1.
Figure 3:
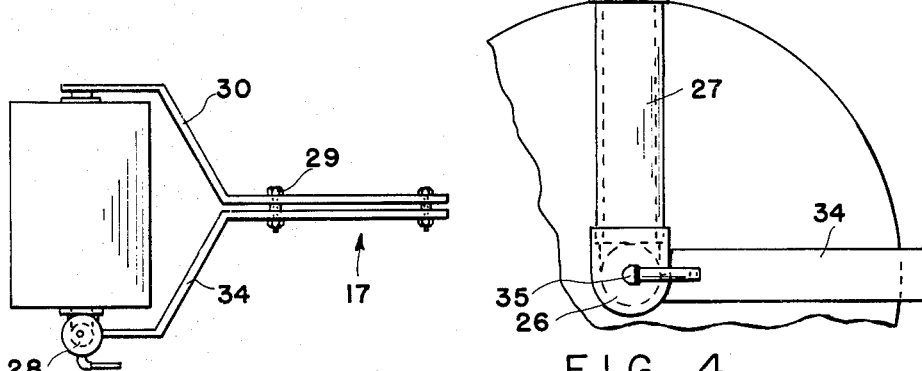
FIGURE 3 is a plan view of the roller tank of FIGURES 1 and 2.

Referring now to the drawing, reference numeral 10 designates a small farm-type of tractor having a power take-off pulley 11. In accordance with the principles of this invention a hydraulic oil pump 12 may be suitably mounted on the tractor and driven from the pulley 11 by an endless V-belt in more or less conventional manner. The pump 12 may be of an inexpensive commerical gear type, and in a representative application have a capacity of 5 g.p.m. at pressures of approximately 500 p.s.i. The pump 12 is preferably permanently mounted on the tractor in some out-of-the-way place so as not to interfere with the use of other attachments. Mounted on the pump 12 is a small reservoir 13 having a combined breather and filler cap 14.

Reference numeral 15 designates a trailer-type of lawn roller having a hollow drum 16 and a towing tongue 17 which is detachably coupled to the tractor 10 by any suitable hitch shown schematically at 18. The roller assembly 15 may, if desires, be furnished with a conventional implement seat 19, and also carried on the assembly 15 is a diaphragm-type of hydraulically actuated pump 20. Pump 20 may be of the kind disclosed and claimed in copending application Serial No. 307,901 filed September 10, 1963 or of the general kind disclosed in U.S. Patent No. 2,625,886. Pumps of this nature are known as pressure exchange pumps in which a flexible diaphragm or piston separates the actuating oil from the liquid being pumped and have the advantage of being substantially free from wear while yet being operative to develop and deliver high pressures at reasonable volume commensurate with the volume and pressure of the hydraulic oil delivered to them. In the present disclosure, such powering hydraulic oil is transferred from the pump 12 to the pump 20 by a high pressure hose 21 and, in actual practice, this hose has a "quick-disconnect" and self-sealing coupling at the pump 12 whereby the hose may be quickly attached to and detached from the pump 12 without loss of fluid. There is also provided a second hose 22 for the return oil which discharges into the reservoir 13 and, again, a quick-disconnect and self-sealing coupling is provided for the hose 22 at the reservoir 13. It will be understood that oil for the pump 12 is withdrawn directly from the reservoir 13.

In accordance with a principle of this invention the roller 16 is specially constructed to serve as the transporting tank for the liquid spray material to be dispensed. Thus, one end wall of the roller 16 is provided with an enlarged central opening 23 about which is fitted a hub 24 having an outwardly directed hollow spindle having a pair of spaced external annular grooves to receive O-ring seals 25. Swiveled on the spindle of hub 24 over the seals 25 is a pipe elbow 26 formed at its outer free end with female pipe threads into which is secured a pipe length 27 closed off at its upper end by means of an apertured cap 28. The pipe length 27 and fittings 24 and 26 are of generous internal diameter so that granulose spray materials may be readily poured thereinto and flushed down into the roller in preparing the spray mix.

Figure 4:
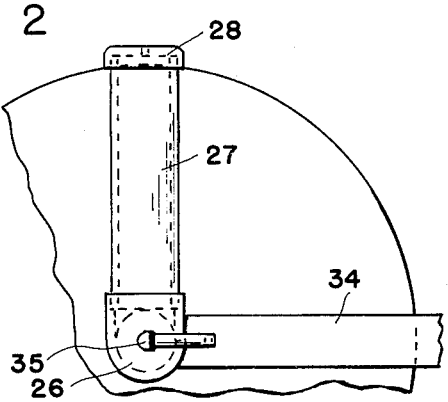
FIGURE 4 is a fragmentary end view of the roller tank of FIGURE 2.

The fitting 26 is retained on the spindle of hub 24 by the frame structure of the tongue 17. For this purpose the tongue 17 is formed in two halves—left and right—detachably secured together by the bolts and spacers 29. The left half of the tongue consists of the bent bar 30 carrying at its rear end an inwardly directed pin 31 which is rotatably received within a socket member 32 affixed centrally to the outer surface of the left end plate 33 of the roller assembly. The right half of the tongue consists of the bent bar 34 which at its rear end is rigidly welded to the fitting 26 as shown in FIGURE 4. It will be understood that the bars 30 and 34 are sufficiently stiff or are sufficiently reinforced that there will be little or no spreading of their rear end portions which are swivably attached to the roller.

To retrieve the liquid spray from the roller, I provide a bent dip-tube 35 which is rigidly welded or brazed in an aperture formed in the outer wall of fitting 26 and thence extends into the roller centrally through the aperture 23 and then bending downwardly to the bottom of the roller where its inlet end is provided with a screen 36. Outwardly of the fitting 26 the dip-tube 35 is bent forwardly for ease of connection by means of a conduit or hose 37 to the inlet of the hydraulic pumping unit 20. It should be understood that the sub-assembly comprised of the parts 26, 27, 28, 35 and the bar 34 may be removed from and applied to the roller when retaining bolts 29 are removed. In removing this sub-assembly, the fitting 26 may first be slid outwardly off the end of the spindle of hub 24 after which it may be tilted to allow the depending portion of the dip-tube 35 to be withdrawn. Since the tube 35 is positionally related at right angles to the tongue 17 and the tongue is normally retained in horizontal position the dip-tube will always extend to the bottom of the roller to empty the contents thereof. To assist in mixing the liquid spray material and to keep the same mixed in the roller, I provide a number of circumferentially spaced paddles 38 on the inner diameter of the cylindrical wall 39 of the roller assembly. For lubrication purposes a grease fitting 39 is provided for the socket 32 and a similar fitting 40 provided on the fitting 26 for the same purpose and for the added function of sealing the swivel joint between the members 24 and 26. It should be noted that the fitting 40 is positioned intermediate the two spaced O-rings 25. There is thus provided an effective rotary seal which permits the roller to be substantially filled with the liquid material to be dispensed thereby vastly increasing the haulage capacity of the tank.

The high-pressure outlet port or ports of the expansion pump 20 may be connected either directly or through a surge standpipe, not shown, to a high-pressure hose 41 and thus to a spray gun 42. The latter may be manipulated by a person walking or seated on the seat 19 as desired, and if the outfit is to be used for spreading liquid fertilizer or weed killer the user may find it convenient to attach a wide-spread spray boom, also not shown, to the unit for attachment to the outlet of the pump 20 for substantially automatic operation.

It should now be apparent that I have provided improved mobile power spraying equipment which accomplishes the objects initially set out above. The equipment may be used with various existing types of small and medium sized tractors, most of which are equipped with power take-off pulleys for driving mowers, etc. It is only necessary to mount a single small pump on the tractor in such manner that when its drive belt is disconnected the power take-up pulley may be used to run other equipment. Only a single pair of quick-detachable hose connections need be connected or detached to couple or uncouple the equipment from the tractor.

The roller tank provides a number of advantages in that it is very inexpensive, provides its own rolling support, has large capacity, and may be used on lawns or soft and rough ground with absolute safety. Also, since most yard and estate owners require the use of a roller anyway, the dual function of the device of this invention reduces the amount of equipment needed to provide complete services.

While the use of the pressure exchange pump (20) is preferred because of the ease with which high pressures may be generated it should be obvious that if only low pressures are required the oil pump 12 may be replaced with a general purpose gear pump to handle the spray materials direct, thus dispensing with the exchange pump. Also, it should be understood that the roller tank may be used with other types of pumps—such as a piston pump which is mounted on the tractor.

Having thus described my invention what I claim is:

1. Apparatus for containing and transporting a quantity of spray liquid for use with a mobile power spraying assembly comprising a fluid-tight hollow roller adapted to have rolling contact on the ground, a yoke-like tongue pivotally connected to said roller at either axial end thereof and adapted to be connected to a tractor, a dip-tube carried by said tongue and extending axially into said roller and thence toward the bottom thereof whereby liquid contained in said roller may be withdrawn therefrom, a hollow fitting carried centrally of one of the end walls of the roller and providing an axially disposed cylindrical bearing surface, and a second fitting in the nature of a pipe elbow swivably mounted on said bearing surface and presenting an upwardly directed opening whereby granulose spray materials may be inserted in the roller, said dip-tube extending axially through said hollow fitting and carried by said second fitting while extending through an outer wall thereof to a position outside of said second fitting, and said second fitting being rigidly attached to said tongue.

2. Apparatus for containing and transporting a quantity of spray liquid for use with a mobile power spraying assembly comprising a fluid-tight hollow roller adapted to have rolling contact on the ground, a yoke-like tongue pivotally connected to said roller at either axial end thereof and adapted to be connected to a tractor, a dip-tube carried by said tongue and extending axially into said roller and thence toward the bottom thereof whereby liquid contained in said roller may be withdrawn therefrom, a hydraulically actuated pressure exchange pump carried on said tongue and having its liquid spray material inlet connected with said dip-tube, and flexible conduits for supplying and returning hydraulic oil to said exchange pump and adapted to be detachably connected to an oil pump mounted on the tractor.

3. Apparatus according to claim 1 further characterized in that said tongue is made of two sections separable axially with respect to the axis of rotation of the roller, and said first mentioned and second fittings being separable axially upon separation of the two sections of said tongue.

4. Power spraying equipment comprising a trailer adapted to be towed by an engine-driven vehicle having a power take-off, said trailer including a tank for liquid spray material, a hydraulically actuated pressure exchange pump carried by said trailer and adapted to receive liquid from said tank and deliver the same to a conduit at high pressure, an oil pump adapted to be mounted on said vehicle and to be driven by said power take-off, and oil supply and return conduits adapted to detachably interconnect said oil pump with said exchange pump whereby said exchange pump may be powered by said oil pump.

5. Apparatus according to claim 4 further including an oil reservoir having a breather and filler cap mounted on and above said oil pump, said oil pump being adapted to receive oil from said reservoir and said return conduit discharging into said reservoir.

References Cited by the Examiner

UNITED STATES PATENTS

| | | | |
|---|---|---|---|
| 1,377,847 | 5/21 | Miller | 239/147 X |
| 2,548,190 | 4/51 | Arpin | 239/147 X |
| 2,593,696 | 4/52 | Pool | 239—147 |
| 2,625,886 | 1/53 | Browne | 103—150 |
| 2,726,790 | 12/55 | Woelfer | 222—334 X |
| 3,093,268 | 6/63 | Smith et al. | 222—167 |

LOUIS J. DEMBO, *Primary Examiner.*